United States Patent

[19]

Jamail

[11] Patent Number: 5,995,457
[45] Date of Patent: Nov. 30, 1999

[54] METHOD OF MASKING DATA ON DIGITAL VIDEO DISKS (DVD)

[76] Inventor: Randall H. Jamail, P.O. Box 980369, Houston, Tex. 77098

[21] Appl. No.: 08/702,293

[22] Filed: Aug. 20, 1996

Related U.S. Application Data

[63] Continuation-in-part of application No. 08/510,201, Aug. 2, 1995, Pat. No. 5,608,701, which is a continuation of application No. 08/343,637, Nov. 22, 1994, Pat. No. 5,467,327, which is a continuation-in-part of application No. 08/301,040, Sep. 6, 1994, Pat. No. 5,471,443, which is a continuation of application No. 08/172,849, Dec. 22, 1993, abandoned.

[51] Int. Cl.$^6$ .................................................. G11B 17/22
[52] U.S. Cl. ................................. 369/32; 369/48; 369/54
[58] Field of Search ............................... 369/32, 47, 48, 369/54, 275.3, 275.2, 13, 124, 56, 60, 58, 50, 44.39, 44.26, 284; 360/71, 72.1, 72.2, 78.4

[56] References Cited

U.S. PATENT DOCUMENTS

| | | | |
|---|---|---|---|
| 4,719,615 | 1/1988 | Feyrer et al. | 369/284 |
| 5,293,568 | 3/1994 | Oshiba et al. | 369/32 |
| 5,517,447 | 5/1996 | Bolan et al. | 365/149 |
| 5,526,338 | 6/1996 | Hasman et al. | 369/109 |
| 5,528,570 | 6/1996 | Kondo | 369/48 |
| 5,536,456 | 7/1996 | Kuhwahara et al. | 264/1.33 |
| 5,538,125 | 7/1996 | Okabe | 364/449 |
| 5,538,773 | 7/1996 | Kondo | 428/64.1 |
| 5,539,711 | 7/1996 | Mitani | 369/32 |

*Primary Examiner*—Ali Neyzari
*Attorney, Agent, or Firm*—Alton W. Payne

[57] ABSTRACT

A DVD data masking method comprising the steps of determining the position of the start location, determining the position of the stop location, positioning at least one data track on the DVD between the start location and the stop location, identifying the pre-gap before the start location, and impressing data on the DVD and within the pre-gap for generating the concealed track having a hidden recording area for containing concealed data which can be accessed upon demand for transcription to another medium or for playback. Also, a DVD data masking method is comprising the steps of determining the position of the start location, determining the position of the stop location, positioning at least one data track on the DVD between the start location and the stop location, identifying the gap before a track, and impressing data on the DVD and within the gap for generating the concealed track having a hidden recording area for containing concealed data which can be accessed upon demand for transcription to another medium or for playback. Still further, a DVD is provided pursuant to the methods described.

14 Claims, 9 Drawing Sheets

FIG.1

(PRIOR ART)

| TRACK | INDEX | DESCRIPTION |
|-------|-------|-------------|
| 0 | 0 | Begin play point |
| 1 | 1 | Start Track 1 |
| 1 | 0 | Stop Track 2 |
| 2 | 1 | Start Track 1 |
| 2 | 0 | Stop Track 2 |
| ... | ... | ... |
| X | 0 | Stop Track X |

FIG.3

(PRIOR ART)

METHOD OF MASKING DATA ON DIGITAL VIDEO DISKS (DVD)

CROSS REFERENCE TO RELATED APPLICATION

The present application is a continuation-in-part application of the application of Randall Jamail, bearing U.S. Ser. No. 08/510,201, filed Aug. 2, 1995, now U.S. Pat. No. 5,608,701, entitled "Method of Masking Data On A Storage Medium," which was a continuation of the application of Randall Jamail bearing U.S. Ser. No. 08/343,637, filed Nov. 22, 1994, entitled "Method of Prerecording Data for Playback Upon Demand," which issued as U.S. Pat. No. 5,467,327, which was a continuation-in-part application of the application of Randall Jamail and David Thompson, bearing U.S. Ser. No. 08/301,040, filed Sep. 6, 1994, entitled "Method of Selectively Concealing Magneto-Optical Compact Disk Data For Playback Upon Demand," which issued as U.S. Pat. No. 5,471,443, which was a continuation of the application of equal inventors bearing U.S. Ser. No. 08/172,849, filed Dec. 22, 1993, abandoned, entitled "Method of Prerecording Data for Playback Upon Demand."

FIELD OF THE INVENTION

The present invention relates to a method of masking data on digital video disks (DVD) for selective playback upon demand or for transcription to another medium. Specifically, the present invention relates to adapting digital video disks (DVD) for recording information on such medium in gaps before the data tracks, adjacent to the data tracks or at the end of the data tracks.

BACKGROUND OF THE INVENTION

Data storage media are well known. Particularly, optical data storage media in the form of compact disks are well known. Compact disks are an alternative to long-playing records and magnetic tape cassettes. The disks with which consumers are familiar are optical read-only disks and the common disk player is designed specifically for this type of disk. These disks have a reflective surface containing pits which represent data in binary form. A description of these pits and how they function is provided by Watkinson, "The Art of Digital Audio," Focal Press, Chapter 13.

Compact disks are currently produced by a pressing process similar to the process used to produce conventional long playing records. The process is referred to herein as the "mastering" process. The mastering process starts by first polishing a plain glass optical disk. The disk has an outside diameter from 200 to 240 mm, a thickness of 6 mm and undergoes various cleaning and washing steps. The disk is then coated with a thin chrome film or coupling agent, a step taken to produce adhesion between the glass disk and a layer of photo-resist, which is a photo-sensitive material. Data on a compact disk master tape are then transferred to the glass disk by a laser beam cutting method.

The glass disk is still completely flat after it is written on by the laser beam because pits are not formed until the glass is photographically developed. The disk surface is first made electrically conductive and then subjected to a nickel evaporation process. The disk, typically known as the glass master, then undergoes nickel electrocasting, a process which is similar to that used in making analog phonograph records. A series of metal replications follow, resulting in a disk called a stamper. The stamper is equivalent to a photographic negative in the sense that it is a reverse of the final compact disk; that is, there are now bumps where there were pits. This stamper is then used to make a pressing on a transparent polymer such as polyvinyl chloride, poly(ethyl-metacrylate) or a polycarbonate. The stamped surface is then plated with a reflective film such as aluminum or another metal, and finally a plastic coating is applied over the film to form a rigid structure.

The player operates by focusing a laser beam on the reflective metal through the substrate and then detecting reflected light. The optical properties of the substrate, such as its thickness and index of refraction, are thus critical to the player's detection systems and standard players are designed specifically with these parameters in mind.

The pits increase the optical path of the laser beam by an amount equivalent to a half wavelength, thereby producing destructive interference when combined with other (non-shifted) reflected beams. The presence of data thus takes the form of a drop in intensity of the reflected light. The detection system on a standard player is thus designed to require greater than 70% reflection when no destructive interference occurs and a modulation amplitude greater than 30% when data is present. These intensity limits, combined with the focusing parameters, set the criteria for the compact disks and other optical data storage media which can be read or played on such players. Media on which data can be recorded directly on and read directly from have a different configuration and operate under a somewhat different principle. One example is described in U.S. Pat. No. 4,719,615 (Feyrer et al.).

As optical information recording media of this type, compact disks (herein referred to simply as "CD") have been practically developed and widely used as optical information recording media of ROM (read only memory) type wherein pits are already formed on a light transmitting substrate by means of, for example, a press and a reflective layer of a metal is formed on the surface having such pits. As a further progress from such a ROM type, optical information recording media have been proposed on which information can be recorded by irradiating a laser beam to the substrate as the user requires. For Example, Japanese Patent Publication No. 89605/1979 discloses an optical information recording medium which comprises at least a transparent substrate, a light absorptive layer containing a coloring matter formed on the substrate and a light reflective layer formed on the light absorptive layer, and on which information can optically be recorded and from which the recorded information can be reproduced.

To conduct the reproduction by commercially available CD players, optical recording media must be able to produce read-out signals which satisfy the CD standards which are accepted world wide. To satisfy the CD standards, typical requirements are that the reflectance is at least 70%; the block error rate is at most $3.0 \times 10^{-2}$; and when a push-pull method is employed for tracking pits, the push-pull valve is from 0.04 to 0.07. However, none of the conventional recording media comprising a substrate having a pregroove, a light absorptive layer containing a coloring matter formed on the substrate and a light reflective layer formed on this absorptive layer, uses all the aspects of the CD format satisfying the various conditions prescribed by the CD standards.

Recently a new standard has emerged as prevalent, the digital video disk (DVD). The specifications for the digital video disk (DVD) are as illustrated in Table 1, as well as a comparison with compact disk (CD) specifications.

TABLE 1

| | CD | DVD |
| --- | --- | --- |
| Disc diameter | 120 mm | 120 mm |
| Disc thickness | 1.2 mm | 1.2 mm |
| Disc structure | Single substrate | Two bonded 0.6 mm substrates |
| Laser wavelength | 780 nm (infrared) | 650 and 635 nm (red) |
| Numerical aperture | 0.45 | 0.60 |
| Track pitch | 1.6 um | 0.74 um |
| Shortest pit/land length | 0.83 um | 0.4 um |
| Reference speed | 1.2 m/sec. CLV | 4.0 m/sec. CLV |
| Data layers | 1 | 1 or 2 |
| Data capacity | Aprox. 680 megabytes | Single layer: 4.7 gigabytes Dual layer: 8.5 gigabytes |
| Reference user data rate | Mode 1: 153.6 kilobytes/sec Mode 2: 176.4 kilobyters/sec | 1,108 kilobytes/sec, nominal |
| Video data rate | 1.44 megabits/sec (video, audio) | 1 to 10 megabits/sec variable (video, audio, subtitles) |
| Video compression | MPEG1 | MPEG2 |
| Sound tracks | 2 Channel-MPEG | Mandatory (NTSC) 2-channel linear PCM 2-channel/5.1-channel AC-3. Optional: up to 8 streams of data available |
| Subtitles | Open caption only | Up to 32 languages |

Sony and Philips launched the Compact Disc (CD) digital audio format over a decade ago and gave the world its first taste of digital entertainment. CD has enjoyed great success and among music companies as well as hardware manufacturers. To date, over 120 million CD players and 3 billion CD's have been sold in the United States alone. From its origins as a music format, Compact Disc has grown to encompass computer applications (CD-ROM), imaging applications (Photo CD), and video game applications.

In September 1995, nine companies joined force to create a single, unified standard for the emerging DVD format. The format enjoys the enthusiastic support of the world's major electronics companies. As a music format, DVD meets the specific and detailed requests of the music companies as well as hardware manufacturers. As a movie playback format, DVD meets the specific and detailed requests of the motion picture industry's Studio Advisory Committee. As a computer ROM format, DVD meets the specifications of the computer industry's Technical Working Group. No other product has enjoyed such broad international support across so many industries prior to launch.

Many accolades have been touted for the DVD format. Like CD, DVD is 120 mm (4¾ inches) in diameter and 1.2 mm thick. The new DVD players will be able to play the billions of existing music Cds. DVD software can be replicated using existing CD production facilities. Using the existing form factor reduces the re-tooling required to manufacture DVD Players and DVD-ROM drives. Non-contact laser optics mean playback without wear and tear. A disc-based format means the kind of split-second random access that no tape format can match. As with Compact Disc, DVD will be durable, and tolerant of dust, dirt and fingerprints. The DVD standard defines a disc that maintains the overall dimensions, look and feel of the current Compact Disc. Some of these similarities will be unmistakable to consumers experiencing DVD for the first time. Others are less apparent, but equally important to the expected rapid and successful introduction of DVD.

DVD holds seven times the data of a CD: 4.7 gigabytes per layer, as compared to 680 megabytes for CD. DVD offers a dual-layer, single-side option, for even higher capacity: 8.5 gigabytes on a single side. Every DVD is a bonded disc, composed of two 0.6 mm substrates joined together. Compared to CD, DVD uses smaller pits and a more closely spaced track. The result is a significant increase in data density. The higher Numerical Aperture (NA) lens of DVD helps the laser focus on the smaller pits. Almost every aspect of DVD was developed and refined to achieve the seven-fold increase in data capacity and data density. Refinements include smaller pit dimensions, a more closely-spaced track (finer "track pitch"), and a shorter-wavelength laser. Conventional CD players and CD-ROM drives use a laser that emits invisible, infrared light at the wavelength of 780 nanometers. The new DVD players and DVD-ROM drives use a laser that emits red light at 650 and 635 nm. The shorter wavelengths are better suited to reading the smaller, more densely packed pits. The laser assembly has also been refined with a higher Numerical Aperture (NA) lens, resulting in a narrower, more tightly focused laser beam. Even more significantly, DVD's digital modulation and error correction schemes have been specifically designed to support the increase in capacity. The 8-to-16 (EFM PLUS) modulation scheme is highly efficient and ensures backward compatibility with current discs as well as with future rewritable media. And the RS-PC (Reed Solomon Product Code) error correction system is approximately 10 times more robust than the current CD system.

The DVD format offers both single-sided, single layer discs and single-sided, dual-layer discs. On a single-sided, dual-layer disc, the laser first shines through the nearer, semi-transmissive layer to track the deeper layer of pits. The laser then switches focus to read the semi-transmissive layer. For future applications that may demand even higher on-line capacity, the DVD specifications call for a single-sided, dual-layer disc option, which nearly doubles the standard disc's capacity to 8.4 gigabytes; more than 12 times the data of a standard Compact Disc. This single-sided, dual-layer disc incorporates a semi-transmissive film which coats the layer of pits that is closest to the laser pickup. Therefore, when the laser "plays" the deeper data layer, it is actually reading through this semi-transmissive material. At the end of the first (deeper) layer, the laser pickup instantly changes its focus and begins reading the second (semi-tranmissive) layer. An electronic buffer ensures that there is seamless playback between layers.

Just as the original CD created a revolution in audio, DVD will raise the standard for home video picture quality. DVD delivers the best color, sharpness and clarity in home video, surpassing the Laserdisc standard. DVD also offers high resolution, with exception rendering of fine picture detail. Video distortion is extremely low, which reduces unwanted color "noise." Because the recording format is component video, as opposed to NTSC composite video, the pictures are free of the well-known drawbacks of NYSC—artifacts including dot crawl and cross color distortion. And because DVD is an optical format, the picture quality doesn't degrade over time and repeated use. The CCIR-601 digital video standard specifies a video rate of 167 megabits per second. At this rate, the 4.7 gigabyte capacity of a standard DVD could only store roughly 4 minutes of digital video. Thus, some form of data compression is required. DVD takes advantage of a sophisticated compression technology called MPEG2. It's a set of flexible compression standards, the second to emerge from the Moving Picture Experts Group (MPEG). MPEG2 works by analyzing the video picture for repetition, called redundancy. Over 95% of the digital data that represents a video signal is redundant, and can be compressed without visibly harming the picture quality. By eliminating redundancy, MPEG2 achieves superb pictures at far lower bit rates. As implemented for DVD, MPEG2 encoding is a two-stage process, where the signal is first evaluated for complexity. Then, higher bit rates are assigned to complex pictures and lower bit rates to simple pictures, using an "adaptive," variable bit-rate process. The DVD format uses 4:2:0 component digital video compressed to bit rates with a range of up to 10 megabits per second. Although the "average" bit rate for digital video is often quoted as 3.5 megabits per second, the actual figure will vary according to movie length, picture complexity and the number of audio channels required. A single-layer, single-sided DVD has enough capacity to hold two hours and 13 minutes of spectacular video on a 4¾-inch disc. At the nominal average data rate of 3.5 megabits per second, this still leaves enough capacity for discrete 5.1-channel digital sound in three languages, plus subtitles in four additional languages. Including video, audio and subtitles, the total average data rate is estimated to be 4.962 megabits per second. And because it's single-sided, DVD can store all this with no need to flip the disc over.

DVDs released in the United States will be capable of carrying Dolby® AC-3™ digital audio sound tracks with either 2 or 5.1 channels. Unlike Dolby Pro Logic® coding, Dolby AC-3 multi-channel sound provides five completely separate (discrete) channels: Left, Center, Right, Left-Rear and Right-Rear, plus a common Subwoofer channel. Dolby AC-3, which uses a digital bit rate of 384 kilobits per second, is already well accepted among videophiles and home theater enthusiasts. As a true digital system, DVD offers high quality sound, with outstanding dynamic range, vanishingly low distortion, wide frequency response and wow and flutter beneath the threshold of measurement. As an option to Dolby AC-3 sound, DVD also enables producers to choose 16-bit linear, CD quality stereo sound with Dolby Pro Logic encoding. And to facilitate international distribution of movie discs, DVD makes possible up to eight languages and 32 sets of subtitles.

The design of DVD reflects the widespread success of CD-ROM as a data carrier for computer programs, databases, multimedia software and video games. As computer processing power continues to increase, the need for higher capacity media is becoming increasingly apparent. And expanding markets for high-resolution graphics and full motion video continue to push the limits of existing storage media.

The DVD-ROM format has specific advantages. First is greater capacity. With 4.7 gigabytes of storage capacity on a single layer and 8.5 gigabytes on a dual-layer disc, DVD-ROM offers more than 12 times the capacity of CD-ROM. Also, backward compatibility is a great advantage. New DVD-ROM drives will play the tens of millions of existing CD-ROMs. On-line availability creates an advantage. DVD-ROM delivers its increased capacity on a single side; consumers will not need to turn the disc over and computer manufactures will not need to re-design their products to fit new drives. Faster data transfer will be available. Even a standard DVD-ROM drive blasts along at higher data transfer speeds than even the fastest current CD-ROM drive. Future recordability is an enhancement. DVD-ROM will be compatible with future high density recordable (DVD-Write Once) and rewritable (DVD-Rewritable) media. Affordable cost is an advantage for consumers and manufactures. DVD-ROM will ultimately be priced comparably with current CD-ROM products.

It is, therefore, a feature of the present invention to provide a method of recording data for concealing the data for later playback upon demand on a DVD.

Additional features and advantages of the invention will be set forth in part in the description which follows, and in part will become apparent from the description, or may be learned by practice of the invention. The features and advantages of the invention may be realized by means of the combinations and steps particularly pointed out in the appended claims.

SUMMARY OF THE INVENTION

To achieve the foregoing objects, features, and advantages and in accordance with the purpose of the invention as embodied and broadly described herein, a method of masking data on a DVD for selective playback upon demand or for transcription to another medium is provided.

A method of masking data on a DVD for selective playback upon demand or for transcription to another medium is provided. The DVD works with a player or transcriber such that the DVD has a start location and a stop location with at least one data track therebetween. Prior to the start location is typically a pre-gap. Each data track has a data recording area for recording and reproducing the data, and each track including a start position indicative of a beginning location for the data recording area for that track. The start location precedes the first start position for the first track with respect to location or time, and the stop location follows the last data recording area for the last track with respect to location or time. The first start position is indicative of the beginning of the data recording area for a first track and the start position for each subsequent track, if any, is indicative of the beginning of the data recording area for the respective track.

The DVD data masking method comprising the steps of determining the position of the start location, determining the position of the stop location, positioning at least one data track on the DVD between the start location and the stop location, identifying the pre-gap before the start location, and impressing data on the DVD and within the pre-gap for generating the concealed track having a hidden recording area for containing concealed data which can be accessed upon demand for transcription to another medium or for playback.

In another embodiment, the DVD data masking method comprises the steps of determining the position of the start location, determining the position of the stop location, positioning at least one data track on the DVD between the start location and the stop location such that the data track has, adjacent thereto, at least one of sufficient location or time for accepting a concealed data track, which sufficient location or time is defined as a gap, and impressing data on the DVD and within the gap for defining the concealed track having a hidden recording area such that the hidden recording area is located adjacent any data track and contains concealed data which can be accessed upon demand for transcription to another medium or for playback.

In another embodiment of the present invention, a DVD containing data for selective playback upon demand or for transcription to another medium and for communication with a player, transcriber or the like is provided. The DVD comprises a start location, a stop location, at least one data track between the start location and the stop location, and a pre-gap prior to the start location. Each data track further comprises a data recording area for executing either recording and/or reproducing the data. Each track including a start position indicative of a beginning location for the data recording area for that track. The start location precedes the first start position for the first track for location or time, and the stop location follows the last data recording area for the last track for location or time. The first start position is indicative of the beginning of the data recording area for a first track and the start position for each subsequent track, if any, is indicative of the beginning of the data recording area for the respective track. At least one data track is on the DVD between the start location and the stop location. The pre-gap comprises data impressed on the DVD and within the pre-gap for defining a concealed track having a hidden recording area for containing concealed data which can be accessed upon demand by the player or transcriber for transcription to another medium or for playback.

In yet another embodiment of the present invention, a DVD containing data for selective playback upon demand or for transcription to another medium and for communication with a player, transcriber or the like is provided. The DVD comprises a start location, a stop location, and at least one data track between the start location and the stop location. Also, a gap, adjacent to at least one track, is provided. The gap comprises a data recording area for executing recording and/or reproducing data. Each data track further comprising a data recording area for executing at least one of recording and reproducing the data, and each track including a start position indicative of a beginning location for the data recording area for that track. The start location precedes the first start position for the first track for location or time, and the stop location follows the last data recording area for the last track for location or time, The first start position is indicative of the beginning of the data recording area for a first track and the start position for each subsequent track, if any, is indicative of the beginning of the data recording area for the respective track, such that at least one data track is on the DVD between the start location and the stop location. The gap further comprises data impressed on the DVD and within the gap for defining a concealed track having a hidden recording area for containing concealed data which can be accessed upon demand by the player or transcriber for transcription to another medium or for playback.

BRIEF DESCRIPTION OF THE DRAWINGS

The accompanying drawings which are incorporated in and constitute a part of the specification, illustrate a preferred embodiment of the invention and together with the general description of the invention given above and the detailed description of the preferred embodiment given below, serve to explain the principles of the invention.

The above general description and the following detailed description are merely illustrative of the generic invention, and additional modes, advantages, and particulars of this invention will be readily suggested to those skilled in the art without departing from the spirit and scope of the invention.

DETAILED DESCRIPTION OF THE PREFERRED EMBODIMENTS

Reference will now be made in detail to the present preferred embodiments of the invention as described in the accompanying drawings.

The presently preferred application of the present invention is for use with standard digital video disks (DVD) as found in, for example, music and record stores. However, the present invention is applicable for use in other related storage media such as, for example, DVD-ROM discs and related DVD discs. A wide selection of DVD storage media will be available for entertainment, education, and business.

Standard music CDs are to be replaced with DVD storage media. DVD storage media will provide sound and music, as well as video where appropriate, recorded in a single format. The present invention is especially adaptable for use in the DVD format. The DVD format, as were prior formats for storage media, is silent with respect to concealing tracks or data between or adjacent to accessible tracks or data available for use.

Developers and industry producers have implemented numerous and varied standards or protocols. Of particular relevance are the DVD standards developed by an industry effort for a universal format. It is expected that the DVD standard will become the industry standard for the digital industry in all areas. The present invention provides a significant advancement to all known DVD standards for digital technology.

Further, the present invention has application to other known standards or protocols. Standards of relevance and possible application to the present invention are the Philips/Sony CD Digital Audio technology standards, known as the Red Book; Philips/Sony CD-ROM standards, known as the Yellow Book; the Philips/Sony CD-I standards, known the Green Book; the Philips/Sony Recordable CD standards, known as the Orange Book; the Philips/Sony CD-Video/Laser Disc standards; the Philips/Sony CD-ROM XA standards; the Philips/Sony CD-I Ready standards; the Philips/Sony CD-I Bridge standards; the Philips/Kodak Photo CD standard; and the Philips/JVC Video CD specification standard, known as the White Book.

It is known in the industry to use a pre-gap on the compact disk and also on the DVD. The pre-gap is a buffer between a start communication location on the DVD and a first start mark indicative of a beginning location for the data recording area for the first track on the DVD. The start communication location on the DVD is typically closer to the perimeter of the DVD so that the CD is transcribed in an outward expanding radial direction. However, it can be appreciated that other recording/transcribing techniques are adaptable for use with the present invention, such as for example, an inward contracting radial direction. The pre-gap is provided, and may be required, to assure that the player can align itself with the start mark. Typically, the pre-gap is approximately two (2) seconds on a CD, and will be of similar length on a DVD. The pre-gap can be termed a buffer.

The DVD player provides an indexing mechanism. The indexing mechanism reads from the DVD a table of contents. The table of contents associated with the DVD determines, for example, the start and finish location, and respective times for the different tracks or groupings of data on the DVD. The DVD table of contents information is read by the player and stored in memory. Based upon the table of contents information from the DVD, the memory in the player knows, for example, where each track begins, each track ends and the length of the respective track. Typically, the table of contents has the track locations. Each track has a beginning index point and may have an ending index point. For example, the track will begin at index 1 and end at index 0. Thus, the begin play point is at track 1, index 1. If there are X tracks on a DVD, the last play location may be track X, index 0. The location identified by track 1, index 1 may be the begin play point.

Heretofore, the pre-gap provided a location point for aligning the CD or DVD in the player. The players are preprogrammed to locate the end of the pre-gap location, i.e., the predefined begin play location. Thereafter, the table of contents is read by the player and the player is programmed to remember the locations of each of the tracks on the CD. It is advantageous to use the pre-gap as an auxiliary recording zone. Thus, a conventional DVD could be divided into two (2) recording zones, the pre-gap zone and the normal zone or zones.

Using the pre-gap zone provides a new realm of functionality to the DVD player market. No changes or adjustments need to be made to the DVD player whatsoever. Typically, a DVD player can access the pre-gap by pressing and holding the rewind button so that the player scrolls to the beginning of the pre-gap. The length of the pre-gap can be set during manufacture. For example, in a DVD, to use the method of the present invention, termed the Soundboard™ pre-track, the DVD is inserted and the play button is pressed. After the play button engages the DVD and the DVD is aligned, the table of contents is read and the first track is presented for processing, the rewind button is pressed and held providing that the player scrolls to the beginning of the Soundboard™ pre-track. When the front of the pre-track location is reached, the button can be released, and the pre-track zone data will be transcribed by the player. This provides the availability of multiple independent track recording on a DVD.

Figure 1:
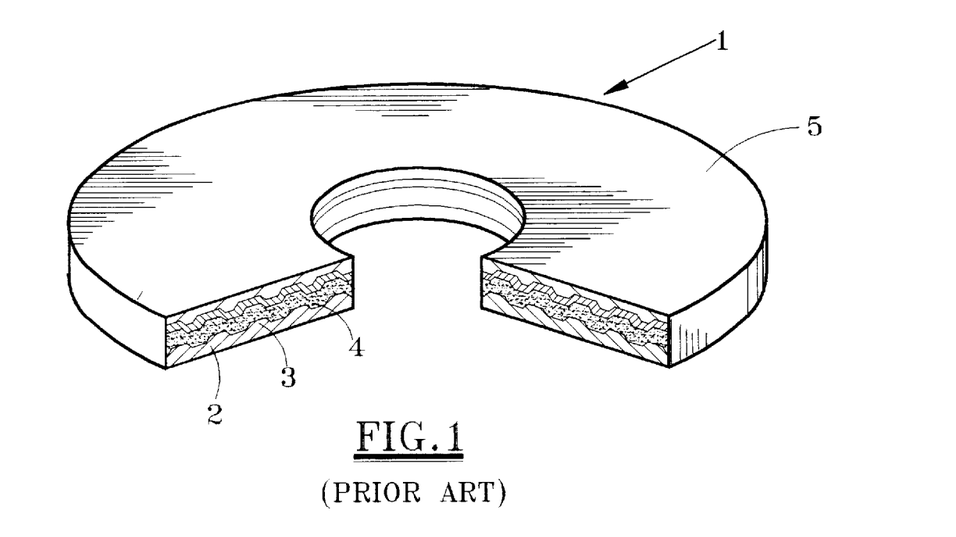
FIG. 1 is a partial cross section perspective view of a conventional compact disk (Prior Art).
Figure 2:
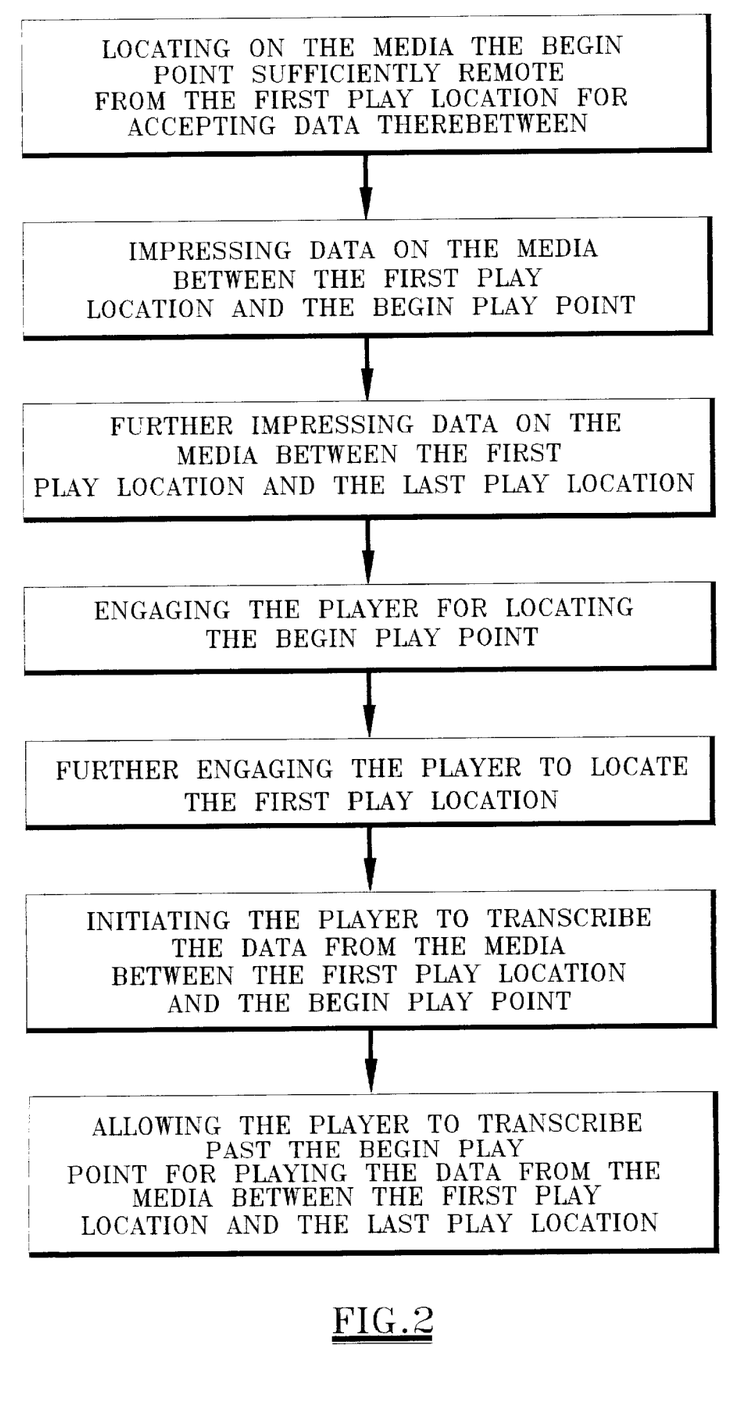
FIG. 2 is a flow diagram illustrating a preferred embodiment of the DVD data masking method of the present invention.
Figure 3:
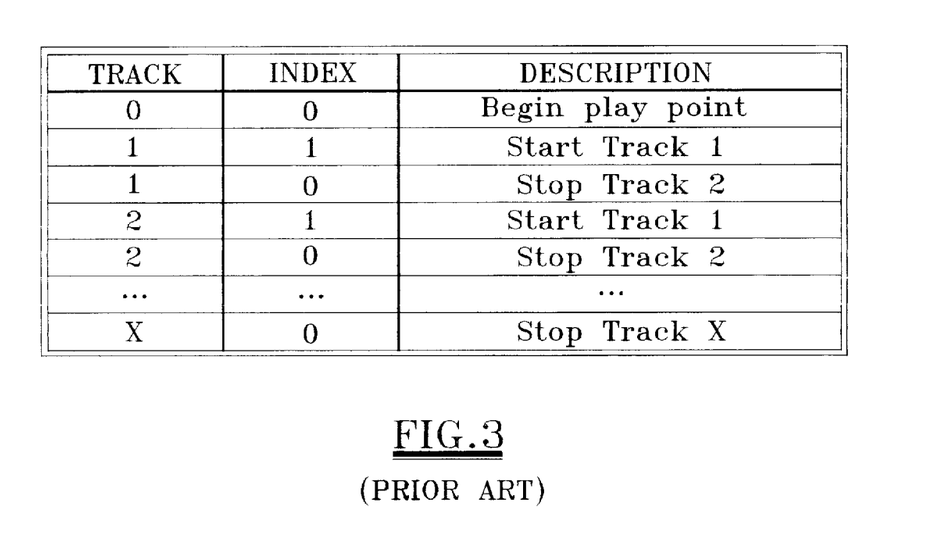
FIG. 3 is a flow diagram illustrating the sequence of track counts on a conventional CD (Prior Art).

FIG. 2 is a flow diagram illustrating the method of the present invention. The method provides for locating the begin play point on the medium sufficiently remote from the first play location for accepting data between the begin play point and the first play location. Data is impressed on the medium in the pre-gap or pretrack location, i.e., between the first play location and the begin play point. Then, data is placed on the media as normally done, for example, between the first play location and the last play location. Further, the method provides for engaging the player for locating the begin play point. The player can be further engaged to locate the first play location. Thereafter, the player is directed to transcribe the data from the media between the first play location and the begin play point, i.e., from the pre-gap zone. Thereafter, the player is provided access to transcribe the remaining data as normally would be transcribed from a DVD by a player.

Figure 4:
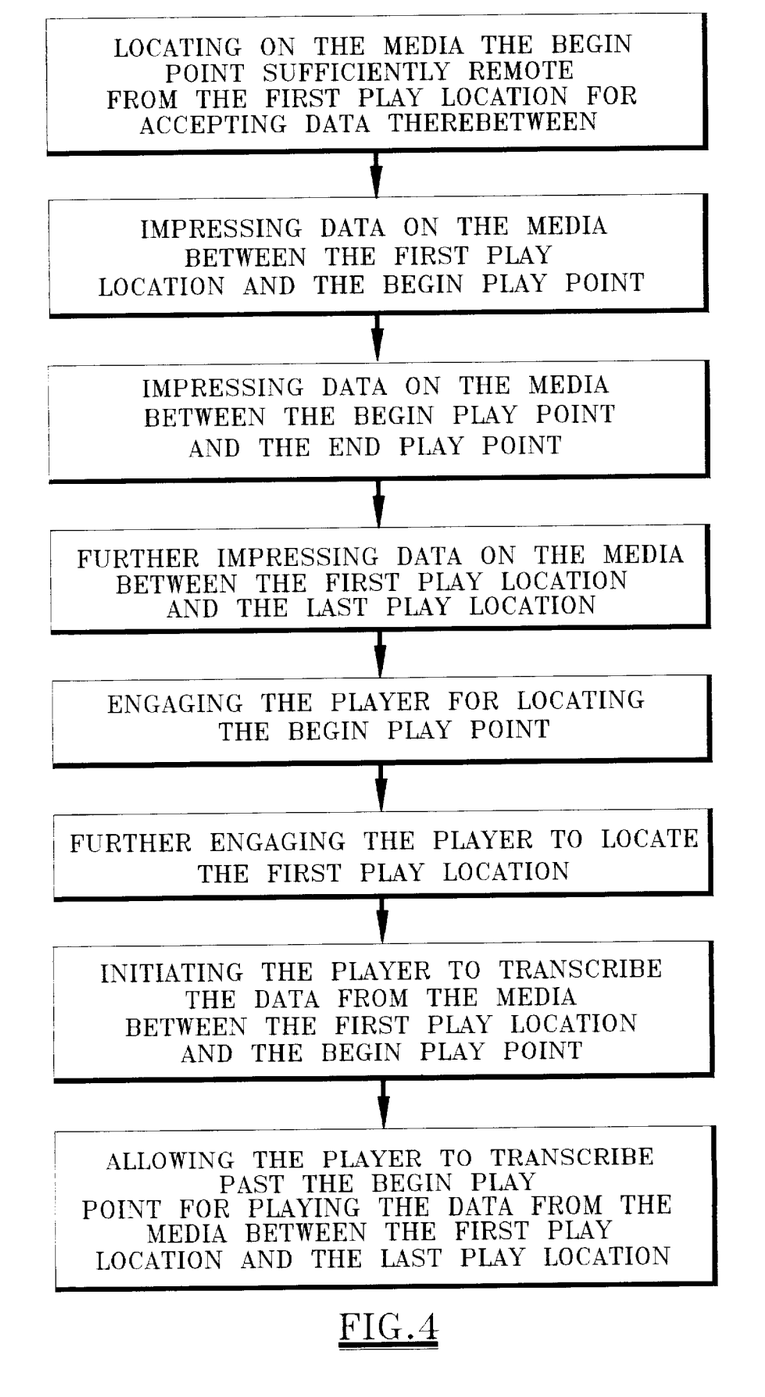
FIG. 4 is a flow diagram of another embodiment of the DVD data masking method of the method of the present invention.

FIG. 4 illustrates another embodiment of the invention of the present application. The method identified in the flow diagram illustrated in FIG. 4 provides for locating the begin play point on the media sufficiently remote from the first play location for accepting data in a pretrack or pre-gap zone. Data is impressed on the pretrack or pre-gap zone which is located between the first play location and the begin play point. Further, as normally done, data is impressed between the begin play point and the end play point. Typically, this is done in a series of tracks. Thereafter, the player is engaged for locating the begin play point. After the begin play point is located, the player is further engaged to locate the first play location. The player can transcribe the data from the media between the first play location and the begin play location so that the pre-gap or pretrack data is transcribed from the pre-gap zone. Lastly, the player can transcribe the data as normally transcribed from between the first play location and the last play location. It can be appreciated that this same technique can be used with respect to essentially any medium. It is not just the DVD medium in which the technique can be incorporated.

Figure 5:
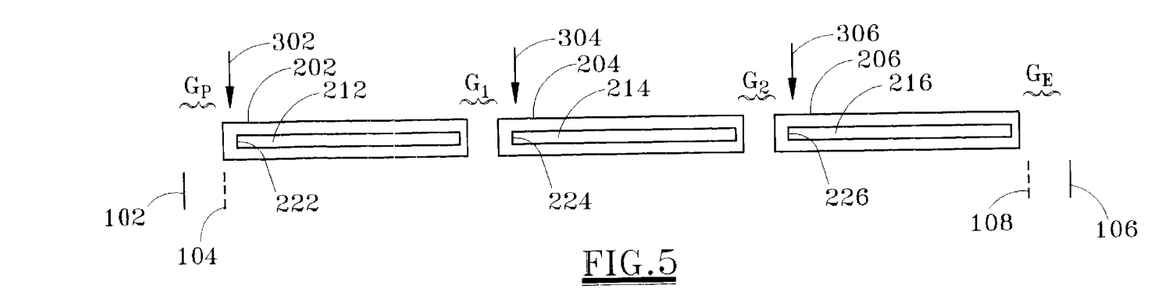
FIG. 5 is a schematic illustration of a representative configuration embodying a track layout adaptable for use with the present invention.

FIG. 5 is a schematic illustration of a representative configuration embodying a DVD track layout adaptable for use with the present invention. FIG. 5 illustrates a DVD storage medium having three data tracks 202, 204, 206. The data tracks 202, 204, 206 are preceded by a start location 102, and terminated by a stop location 106. Between the data tracks 202, 204, 206 and the start location 102 and the stop location 106 are gaps G. More particularly, the gaps G may be defined as a pre-gap $G_P$, a first mid-gap $G_1$, a second mid-gap $G_2$ and an end gap $G_E$. A begin communication location 302 is typically provided for the first data track 202. Further, a begin communication location 302, 304, 306 may be provided for each respective data track 202, 204, 206. It can be appreciated by those skilled in the art that the begin communication location 302 may be the only such location required. For example, the begin communication location 302 is typically adapted for use with a player or a transcriber so that the player or transcriber will know where to begin removing data from the storage medium. Each data track 202, 204 206 has its respective recording area 212, 214, 216. Similarly, each recording area 212, 214, 216 has its respective start position 222, 224, 226. It is appreciated by those skilled in the art that various DVD configurations are adaptable for use with DVD data masking method of the present invention.

Figure 6:
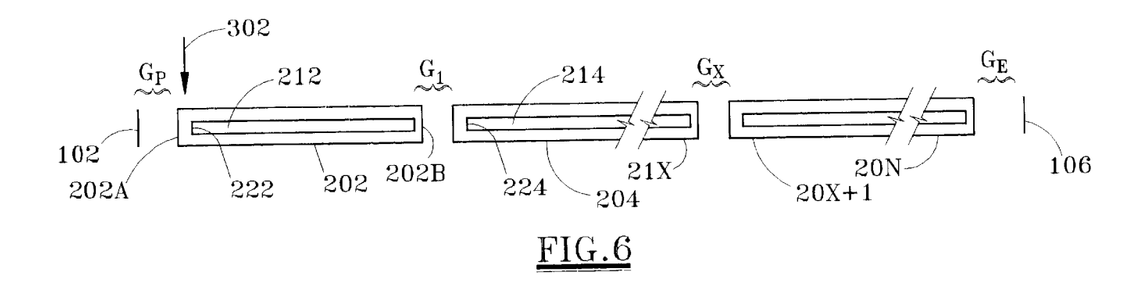
FIG. 6 is a generic illustration of the representative configuration as illustrated in FIG. 5.

FIG. 6 is a generic illustration of the representative configuration as illustrated in FIG. 5. FIG. 6 illustrates that a plurality of tracks can be adapted for use with the storage medium and in conjunction with the present invention. FIG. 6 illustrates data tracks ranging from data track 1 through data track N. The data tracks provide for a pre-gap $G_P$ and following gaps $G_1$ through $G_X$ and $G_E$. Of particular interest is the break away portion of FIG. 6 which illustrates that the data track 204 is spaced in time or distance from the subsequent illustrated data track 21X. The data track 21X is positioned so as to be separated from data track 21X+1 by the gap $G_X$. The data track 21X+1 is spaced remotely from the last data track 21N. The last data track 21N is illustrated being adjacent the end gap $G_E$. The end gap $G_E$ separates the data track 21N from the stop location 106.

Figure 7:
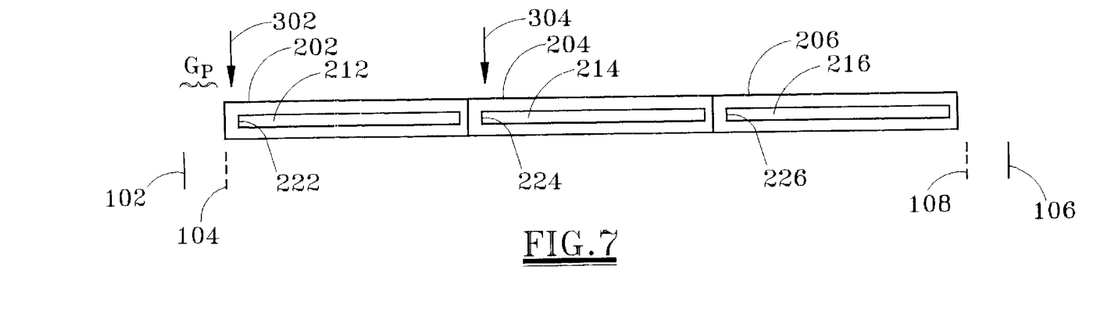
FIG. 7 illustrates a representative configuration of a track layout adaptable for use with the present invention.
Figure 8:
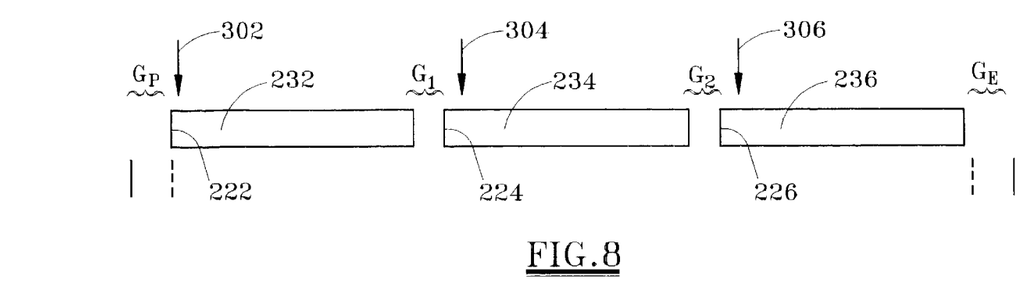
FIG. 8 illustrates an embodiment of a representative configuration wherein the track and recording areas are identical areas.
Figure 9:
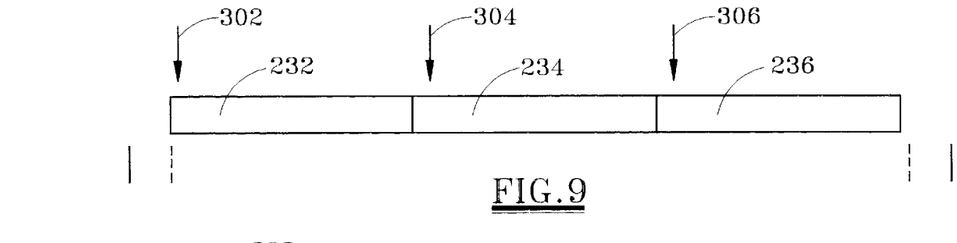
FIG. 9 illustrates another representative configuration of another track layout adaptable for use with the present invention.

It can be appreciated by those skilled in the art that the representative configurations adapted for use with the present invention can vary. FIGS. 7, 8 and 9 illustrate variations of representative configurations which can be adapted for use with the present invention. FIG. 8 illustrates an embodiment of a representative configuration wherein the track and recording areas are identical areas 232, 234, 236. The start position 222, 224, 226 for the respective track/recording areas 232, 234, 236 are used in a similar fashion as previously discussed. It can be appreciated that the tracks illustrated may include concealed tracks pursuant to the present invention. Also, the pre-gap $G_P$, mid-gaps $G_1$, $G_2$ and end-gap $G_E$ are provided as discussed in FIGS. 5 and 6.

FIGS. 7 and 9 illustrate another representative configuration of another track layout adaptable for use with the present invention. The configurations of FIGS. 7 and 9 illustrate tracks without gaps. It can be appreciated that the tracks illustrated may include concealed tracks pursuant to the present invention. Particularly, FIG. 7 illustrates the track 202 abutting the track 204. Also, the track 204 is illustrated abutting the track 206. The recording areas 212, 214, 216 are provided with respective start positions 222, 224, 226, as previously discussed. The pre-gap and post-gap of the representative configurations can exist or not exist as the case may be. For example, FIGS. 5, 7, 8, 9 illustrate a pre-gap $G_P$ existing and not existing, similarly FIGS. 5, 7, 8, 9 illustrate the end-gap $G_E$ existing and not existing. The pre-gaps $G_P$ are identified by labels 102 and 104. The end-gaps $G_E$ are identified by numerals 106 and 108. Particularly effective for use in association with the DVD data masking method of the present invention is the pre-gap, $G_P$.

Figure 10:
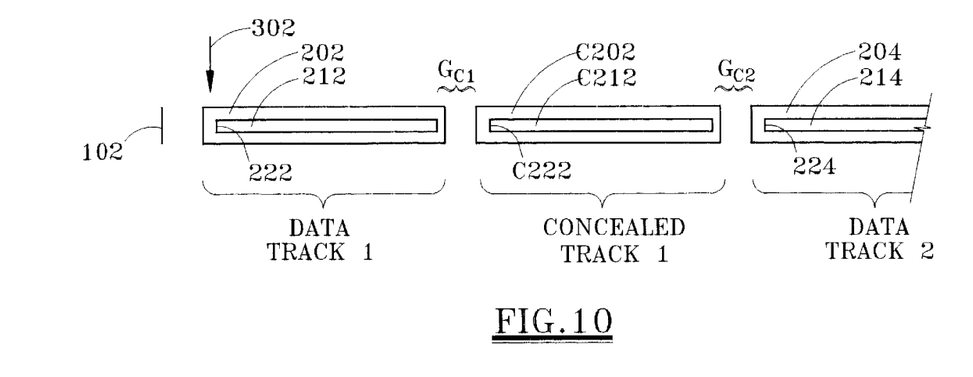
FIG. 10 is a schematic illustrating more particularly a concealed track disposed within a gap as practiced by the present invention.

FIG. 10 is a schematic illustrating more particularly a concealed track disposed within a gap $G_1$ as practiced by the present invention. FIG. 10 illustrates a data track 202 and a data track 204 having a gap $G_1$ there between. The data track 202 has a recording area 212 and a start position 222. The data tracks 202, 204 are preceded by a start location 102. The first data track 202 has a begin communication location 302 aligned in the general vicinity of the start position 222. The data track 204 has a recording area 214 and a start position 224. Between the data tracks 202, 204, is the concealed track C202. The concealed track C202 comprises a recording area C212 and a start position C222. The gap $G_1$ between the data tracks 202, 204 includes the entirety of the concealed track C202 and its adjacent gaps $G_{C1}$, $G_{C2}$. It can be appreciated by those skilled in the art that the gaps $G_{C1}$, $G_{C2}$ associated with the concealed track C202 can be of whatever dimensions are desired with respect to time or location. Also, it can be appreciated by those skilled in the art that the gaps can be displaced or omitted altogether such that the data track 202 abuts against the concealed track C202, and the concealed track C202 abuts against the other data track 204, thus, providing an embodiment without any gaps.

Figure 11:
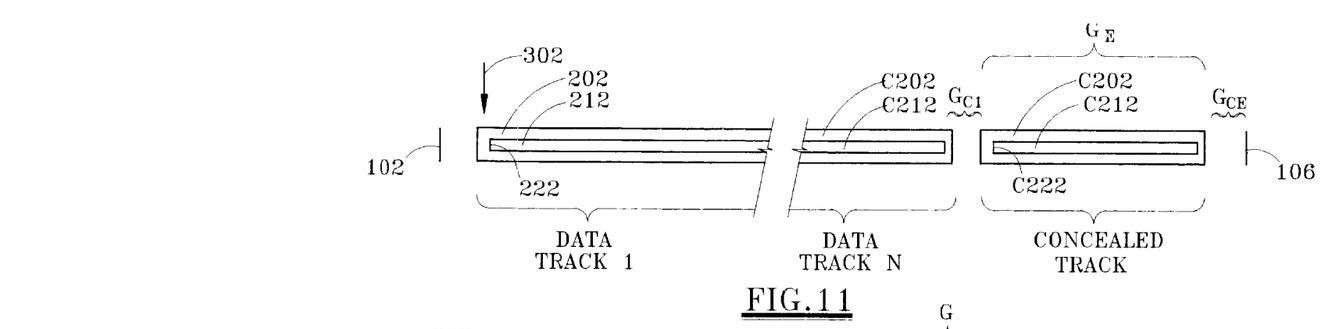
FIG. 11 illustrates yet another embodiment of the present invention with the concealed track at the end of the data medium.

FIG. 11 illustrates yet another embodiment of the present invention with the concealed track C202 at the end of the data medium. FIG. 11 illustrates a plurality of data tracks 201–20N as illustrated with a break away. The break away provides that any number of data tracks can be disposed between the illustrated data tracks 202, 20N. The concealed track C202 having a recording area C212 and a start position C222 is disposed between the last data track 20N and the stop location 106. The gap $G_E$ between the last data track 20N and the stop location 106 provides for the full dimension of the concealed track C202 and its respective gaps $G_{C1}$, $G_{CE}$. As previously discussed, the respective gaps $G_{C1}$, $G_{CE}$ can be altered in size or eliminated completely.

Figure 12:
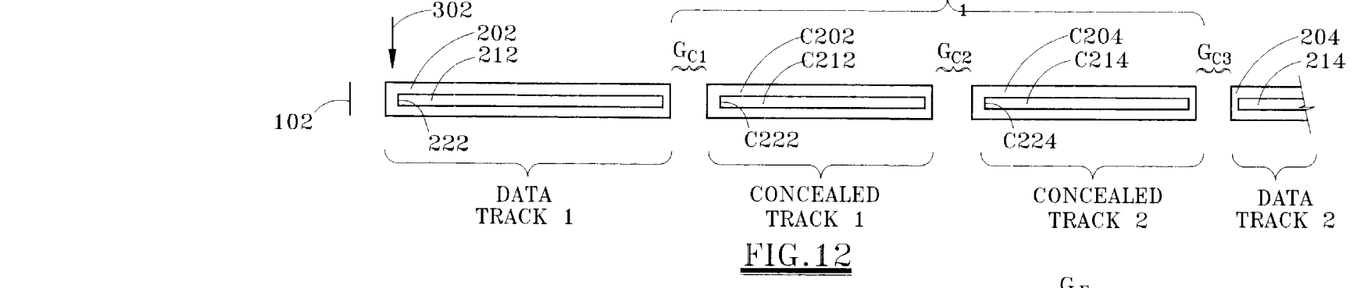
FIG. 12 illustrates yet another embodiment of the present invention wherein two concealed tracks are placed between two data tracks.

FIG. 12 illustrates yet another embodiment of the present invention wherein two concealed tracks C202, C204 are placed between two data tracks 202, 204. The concealed tracks C202, C204 are, for example, placed near the beginning of the storage medium so as to be between the first two data tracks 202, 204. The concealed tracks C202, C204 and their associated gaps $G_{C1}$, $G_{C2}$, $G_{C3}$ fill the entire gap $G_1$ between the first data track 202 and the second data track 204. Each concealed data track C202, C204 has its recording area C212, C214 and start position C222, C224, respectively.

Figure 13:
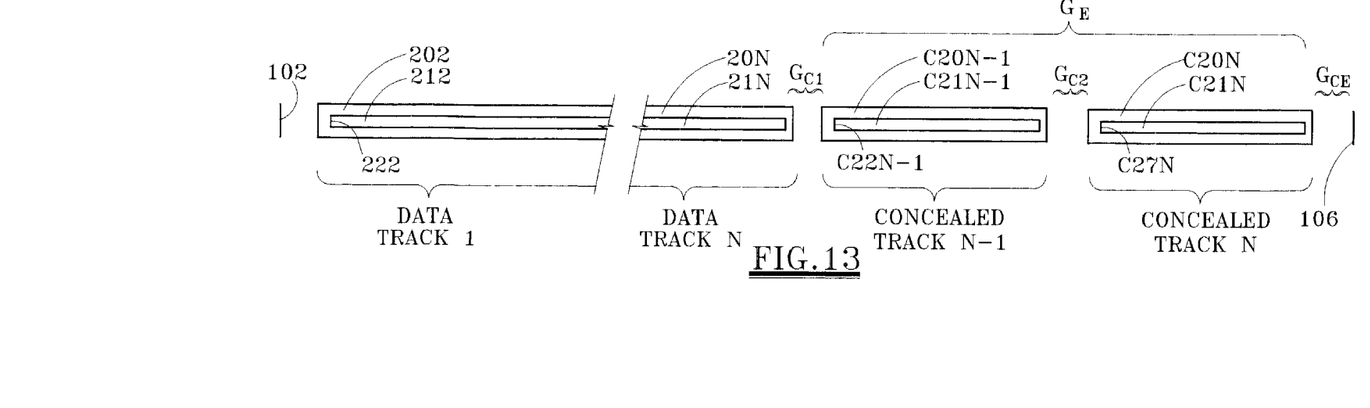
FIG. 13 illustrates yet another embodiment of the present invention wherein a plurality of concealed tracks are located at the end of a storage medium.

FIG. 13 illustrates yet another embodiment of the present invention wherein a plurality of concealed tracks C202, C204 are located at the end of a storage medium. FIG. 13 illustrates two of the plurality of concealed tracks C20N–1, C20N disposed between the last data track 20N and the stop location 106. The concealed data tracks C20N–1, C20N are disposed in the end gap $G_E$. The entire dimension of the end gap $G_E$ includes the first concealed gap $G_{C1}$, the concealed track C20N–1, the second concealed gap $G_{C2}$, the concealed track C20N and the gap $G_{CE}$. In its schematic representation, the embodiment of the invention illustrated in FIG. 13 expands the entire length of the storage medium from the start location 102 to the stop location 106. It can be appreciated that numerous concealed tracks can be placed in each respective gap between data tracks. Also, it can be appreciated that numerous concealed tracks can be placed in the pre-gap just as easily as has been illustrated in the mid-gaps and the end-gap.

Figure 14:
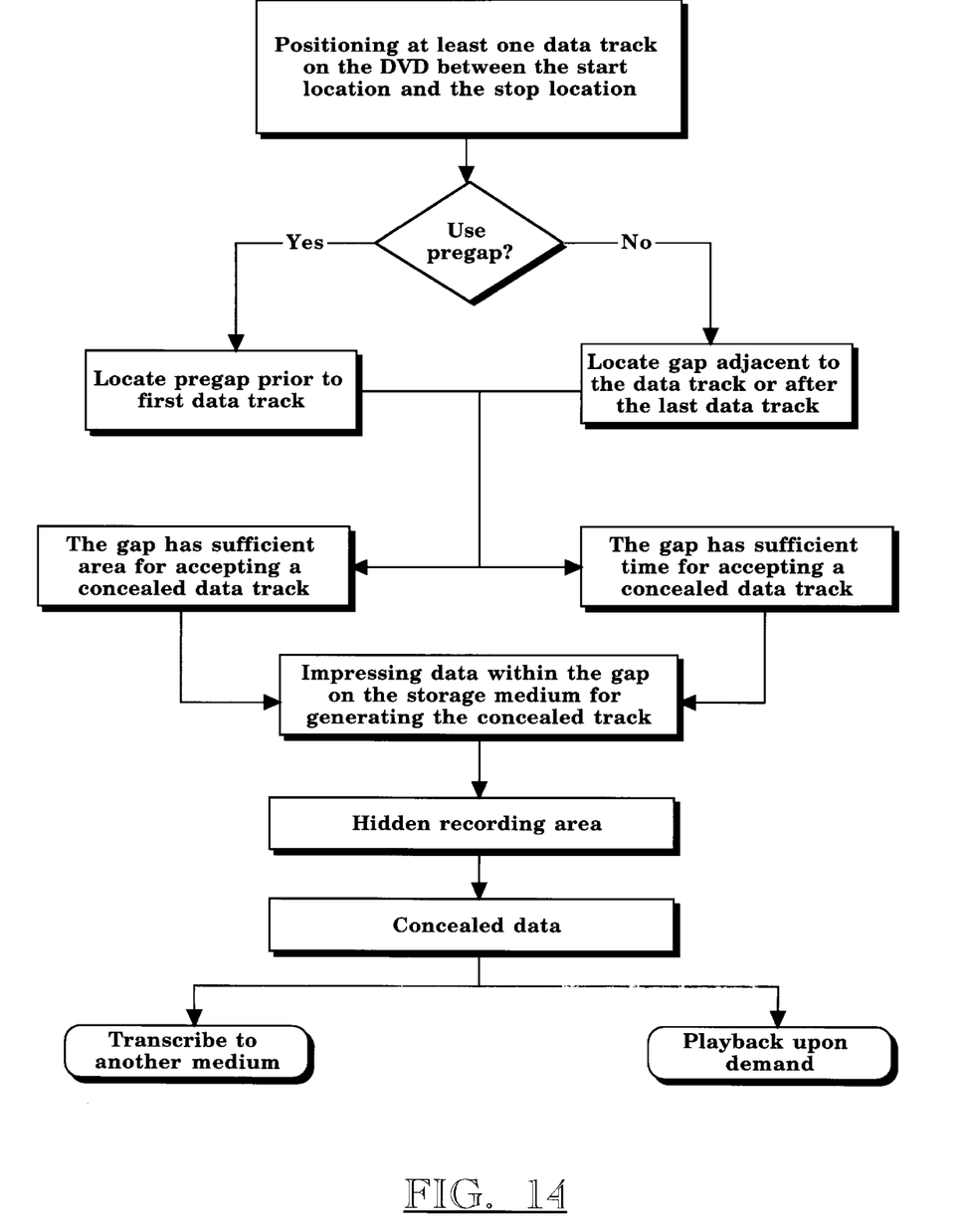
FIG. 14 is a flow chart illustrating one embodiment of the method of masking data on a storage medium as taught by the present invention.

FIG. 14 is a flow chart illustrating one embodiment of the method of masking data on a DVD as taught by the present invention. The method illustrated in FIG. 14 provides for positioning at least one data track on the storage medium between the start location and the stop location. Whether to use the pregap, or not to use the pregap, is determined. If the pregap is used, the pregap is located prior to the first data track. The pregap is the presently preferred embodiment of the present invention. If the pregap is not used, the gap is located adjacent to any other data track, including after the last data track or before any data track. The pregap or gap is determined to have sufficient area or time for accepting a concealed data track. The data is impressed within the pregap or gap on the storage medium for generating the concealed track. Thus, a hidden recording area is generated such that concealed data is available via the player. The player can transcribe the concealed data to another medium or can use the concealed data for playback upon demand.

Figure 15:
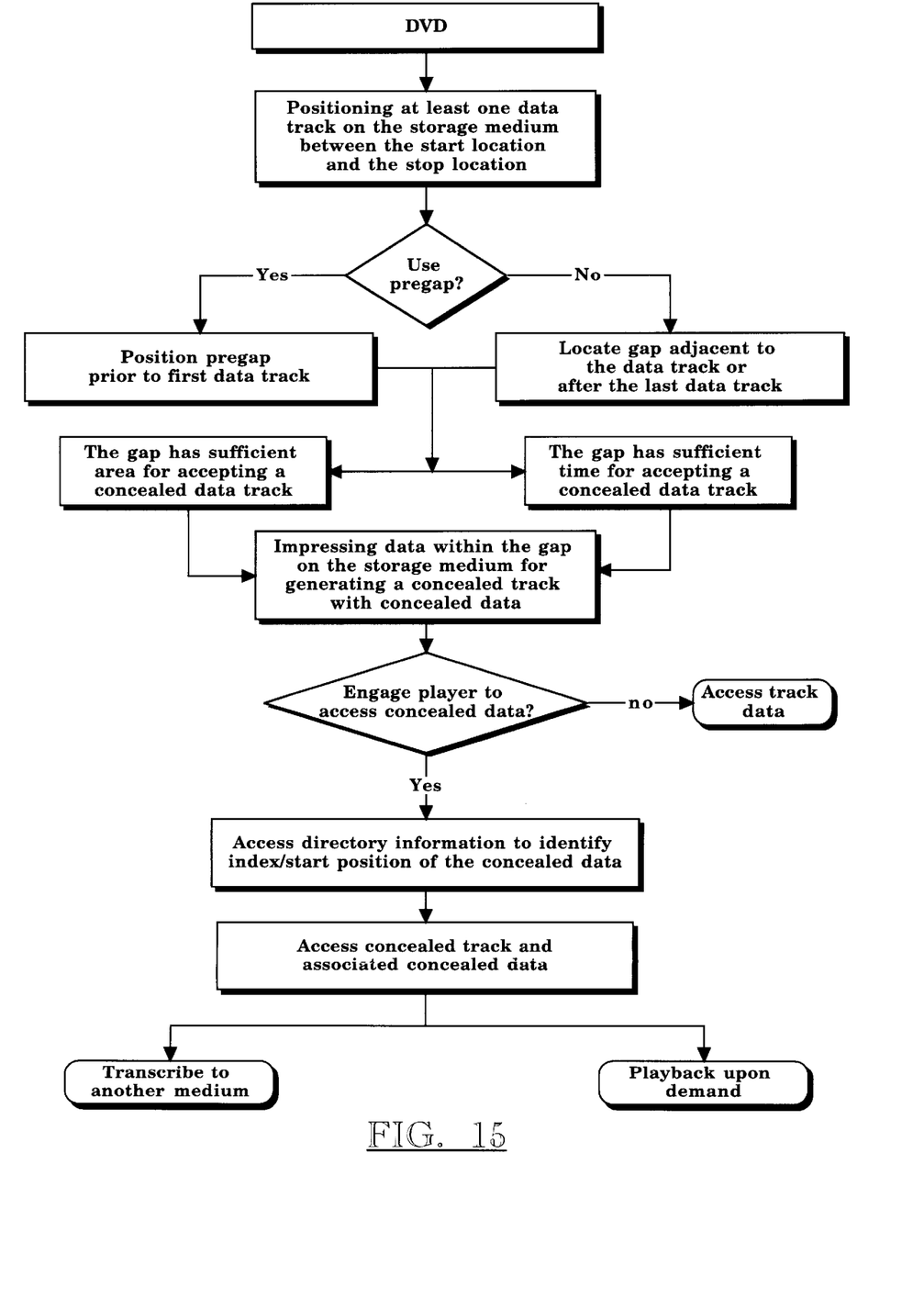
FIG. 15 is another flow chart illustrating a more detailed embodiment of the method of masking data on a storage medium as taught by the present invention.

FIG. 15 is another flow chart illustrating a more detailed embodiment of the method of masking on a DVD as taught by the present invention. Typically, at least one data track is positioned on the DVD between a start location and a stop location. It is determined whether to use the pregap or not to use the pregap. If the pregap is used, the pregap is positioned prior to the first data track. If the pregap is not used, the gap is adjacent to any data track, including after the last data track or prior to any other data track. The pregap or gap is determined to have sufficient area or time for accepting a concealed data track. The data track to be concealed is impressed within the pregap or gap on the storage medium for generating a concealed track with concealed data. The operator of the player determines whether to access concealed data or normal track data. If normal track data is accessed, the player is played normally and the concealed data is undetectable. If the operator of the player elects to access concealed data, the directory information, per the instructions provided by the operator of the player, identifies the index or start position for the appropriate concealed data. The concealed data is accessed by the player for transcription to another medium or for playback.

Figure 16:
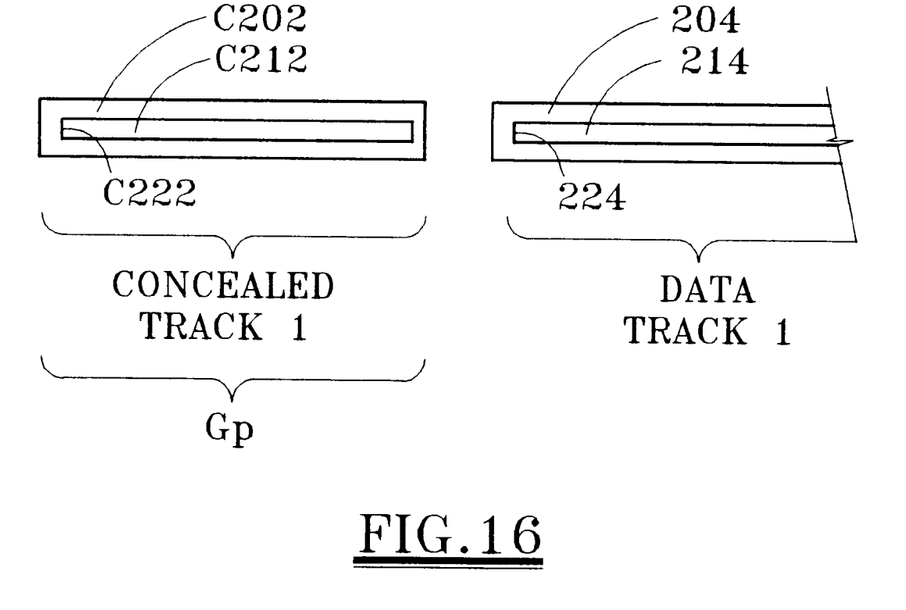
FIG. 16 is a schematic illustrating more particularly a concealed track disposed within a pregap as practiced by the present invention.

FIG. 16 is a schematic illustrating more particularly a concealed track disposed within a pre-gap $G_P$ as practiced by the present invention. FIG. 16 illustrates a data track 204 having a pre-gap $G_P$. The data track 204 has a recording area 214 and a start position 224. The concealed track C202 comprises a recording area C212 and a start position C222. The pre-gap $G_P$ includes the entirety of the concealed track C202 and its adjacent gaps. It can be appreciated by those skilled in the art that the gaps associated with the concealed track C202 can be of whatever dimensions are desired with respect to time or location. Also, it can be appreciated by those skilled in the art that the gaps can be displaced or omitted altogether such that the data track 204 abuts against the concealed track C202, thus, providing an embodiment without any gaps.

Additional advantages and modification will readily occur to those skilled in the art. The invention in its broader aspects is therefore not limited to the specific details, representative apparatus, and the illustrative examples shown and described herein. Accordingly, the departures may be made from the details without departing from the spirit or scope of the disclosed general inventive concept.

What is claimed is:

1. A method of masking data on a DVD for selective playback upon demand or for transcription to another medium, the DVD adapted for communication with a player or transcriber such that the DVD has a start location and a stop location with at least one data track therebetween, each data track including a data recording area for executing at least one of recording and reproducing the data, and each track including a start position indicative of a beginning location for the data recording area for that track, the start location precedes the first start position for the first track for at least one of location or time, and the stop location follows the last data recording area for the last track for at least one of location or time, the first start position is indicative of the beginning of the data recording area for a first track and the start position for each subsequent track, if any, is indicative of the beginning of the data recording area for the respective track, the method comprising the steps of:
(a) determining the position of the start location,
(b) determining the position of the stop location,
(c) positioning at least one data track on the DVD between the start location and the stop location such that the data track has, adjacent thereto, at least one of sufficient location or time for accepting a concealed data track, which sufficient location or time is defined as a gap, (d) impressing data on the DVD and within the gap for defining the concealed track having a hidden recording area such that the hidden recording area is located adjacent any data track and contains concealed data which can be accessed upon demand for transcription to another medium or for playback.

2. The method of masking data on a DVD for selective playback upon demand or for transcription to another medium as defined in claim 1 wherein the step of impressing data on the storage medium for generating the concealed data track further comprises the step of generating the concealed data track comprising the steps of:

(a) identifying a position within the gap relative to at least one of location or time for operative association with a player/transcriber, (b) impressing the concealed data track on the storage medium at the identified position comprising the steps of:
(1) impressing a recording area within the concealed data track, and
(2) impressing a start position within the concealed data track for indicating the location where the recording area begins for the concealed track.

3. The method of masking data on a DVD for selective playback upon demand or for transcription to another medium as defined in claim 2 wherein the step of identifying a position within the gap comprises the step of identifying a position within the gap and with respect to the start location.

4. The method of masking data on a DVD for selective playback upon demand or for transcription to another medium as defined in claim 2 wherein the step of identifying a position within the gap comprises the step of identifying a position within the gap and with respect to the start position of any track.

5. The method of masking data on a DVD for selective playback upon demand or for transcription to another medium as defined in claim 3 wherein the step of identifying a position within the gap and with respect to the start location comprises the step of identifying a position before the start location which position defines a pre-gap.

6. The method of masking data on a DVD for selective playback upon demand or for transcription to another medium as defined in claim 5 wherein the step of identifying a position before the start location comprises the step of identifying a portion of the pre-gap.

7. The method of masking data on a DVD for selective playback upon demand or for transcription to another medium as defined in claim 5 wherein the step of identifying a position before the start location comprises the step of identifying all of the pre-gap.

8. The method of masking data on a DVD for selective playback upon demand or for transcription to another medium as defined in claim 3 wherein the step of identifying a position within the gap and with respect to the start location comprises the step of identifying a position after the start location.

9. The method of masking data on a DVD for selective playback upon demand or for transcription to another medium as defined in claim 4 wherein the step of identifying a position within the gap and with respect to the start position of any track comprises the step of identifying a position before the start position of the track.

10. The method of masking data on a DVD for selective playback upon demand or for transcription to another medium as defined in claim 4 wherein the step of identifying a position within the gap and with respect to the start position comprises the step of identifying a position after the start position of any track.

11. A method of masking data on a DVD for selective playback upon demand or for transcription to another medium, the DVD adapted for communication with a player or transcriber such that the DVD has a start location and a stop location with at least one data track therebetween, prior to the start location is a pregap, each data track including a data recording area for executing at least one of recording and reproducing the data, and each track including a start position indicative of a beginning location for the data recording area for that track, the start location precedes the first start position for the first track for at least one of location or time, and the stop location follows the last data recording area for the last track for at least one of location or time, the first start position is indicative of the beginning of the data recording area for a first track and the start position for each subsequent track, if any, is indicative of the beginning of the data recording area for the respective track, the method comprising the steps of:
(a) determining the position of the start location,
(b) determining the position of the stop location,
(c) positioning at least one data track on the DVD between the start location and the stop location,
(d) identifying the pre-gap before the start location, and
(e) impressing data on the DVD and within the pre-gap for generating the concealed track having a hidden recording area for containing concealed data which can be accessed upon demand for transcription to another medium or for playback.

12. The method of masking data on a DVD for selective playback upon demand or for transcription to another medium as defined in claim 11 wherein the step of impressing data on the DVD and within the pre-gap for generating the concealed track further comprises the step of generating the concealed data track comprising the steps of:
(a) identifying a position within the pregap relative to at least one of location or time for operative association with a player/transcriber, and
(b) impressing the concealed data track on the DVD at the identified position comprising the steps of:
(1) impressing a recording area within the concealed data track, and
(2) impressing a start position within the concealed data track for indicating the location where the recording area begins for the concealed track.

13. A DVD containing data for selective playback upon demand or for transcription to another medium and for communication with a player or transcriber, the DVD comprising:
(a) a start location,
(b) a stop location,
(c) at least one data track between the start location and the stop location, each data track further comprising a data recording area for executing at least one of recording and reproducing the data, and each track including a start position indicative of a beginning location for the data recording area for that track, the start location precedes the first start position for the first track for at least one of location or time, and the stop location follows the last data recording area for the last track for at least one of location or time, the first start position is indicative of the beginning of the data recording area for a first track and the start position for each subsequent track, if any, is indicative of the beginning of the data recording area for the respective track, such that at least one data track is on the article between the start location and the stop location, and (d) a pre-gap, prior to the start location, the pregap comprising data impressed on the DVD and within the pregap for defining a concealed track having a hidden recording area for containing concealed data which can be accessed upon demand by the player or transcriber for transcription to another medium or for playback.

14. A DVD containing data for selective playback upon demand or for transcription to another medium and for communication with a player or transcriber, the DVD comprising:
(a) a start location,
(b) a stop location, and
(c) at least one data track between the start location and the stop location, each data track further comprising a data recording area for executing at least one of recording and reproducing the data, and each track including a start position indicative of a beginning location for the data recording area for that track, the start location precedes the first start position for the first track for at least one of location or time, and the stop location follows the last data recording area for the last track for at least one of location or time, the first start position is indicative of the beginning of the data recording area for a first track and the start position for each subsequent track, if any, is indicative of the beginning of the data recording area for the respective track, such that at least one data track is on the DVD between the start location and the stop location, and (d) a gap, adjacent to at least one track, the gap comprising a data recording area for executing at least one of recording and reproducing data, and the gap further comprising data impressed on the DVD and within the gap for defining a concealed track having a hidden recording area for containing concealed data which can be accessed upon demand by the player or transcriber for transcription to another medium or for playback.

* * * * *